(12) United States Patent
Moen et al.

(10) Patent No.: US 7,096,987 B2
(45) Date of Patent: Aug. 29, 2006

(54) DRIVE UNIT ENCLOSURE ASSEMBLY

(75) Inventors: Richard A. Moen, Glenwood, MN (US); Kevin C. Lent, Glenwood, MN (US)

(73) Assignee: CNH America LLC, Racine, WI (US)

( * ) Notice: Subject to any disclaimer, the term of this patent is extended or adjusted under 35 U.S.C. 154(b) by 273 days.

(21) Appl. No.: 10/882,039

(22) Filed: Jun. 30, 2004

(65) Prior Publication Data

US 2006/0000660 A1    Jan. 5, 2006

(51) Int. Cl.
    *B62D 25/10*    (2006.01)
(52) U.S. Cl. .............. 180/69.2; 180/68.1; 180/68.3; 180/847; 180/193.11; 180/69.21
(58) Field of Classification Search .............. 180/69.2, 180/69.21, 68.1, 68.3; 280/847; 296/193.11
    See application file for complete search history.

(56) References Cited

U.S. PATENT DOCUMENTS

| | | | |
|---|---|---|---|
| 2,086,091 A | 7/1937 | Payette | |
| 2,086,172 A * | 7/1937 | Northup | 180/69.2 |
| 2,413,792 A * | 1/1947 | Sharp | 180/69.2 |
| 2,509,665 A * | 5/1950 | Apel | 296/37.1 |
| 2,699,867 A | 1/1955 | Kitten et al. | |
| 2,952,328 A | 9/1960 | Steiner | |
| 3,004,790 A * | 10/1961 | Mayer | 296/26.09 |
| 3,434,754 A | 3/1969 | Scaglione | |
| 3,918,540 A | 11/1975 | Haupt | |
| 5,725,065 A * | 3/1998 | Knurr et al. | 180/69.2 |
| 6,418,667 B1 | 7/2002 | Moon | |
| 6,508,323 B1 | 1/2003 | Burgo | |
| 6,655,486 B1 | 12/2003 | Oshikawa et al. | |
| D512,080 S * | 11/2005 | Moen et al. | D15/31 |
| 2003/0051931 A1 | 3/2003 | Johansson et al. | |

* cited by examiner

*Primary Examiner*—Christopher P. Ellis
*Assistant Examiner*—Cynthia Collado
(74) *Attorney, Agent, or Firm*—Rebecca Henkel

(57) ABSTRACT

The invention provides an enclosure assembly configured to enhance accessibility to a drive unit of an agricultural applicator. The enclosure assembly generally includes a first panel and a second panel pivotally connected to the enclosure assembly and moveable between closed and open positions. In the closed position, the first panel is positioned in general alignment with the second panel. The enclosure assembly also accommodates an exhaust outlet extending upward from the drive unit. The forward end of the first panel includes a first cutout portion and the rearward end of the second panel includes a second cutout portion each configured in the closed position to receive the exhaust outlet. From the closed position, the first panel pivots in a rearward direction and the second panel pivots in a forward direction, relative to the forward direction of travel, to access the drive unit.

20 Claims, 6 Drawing Sheets

DRIVE UNIT ENCLOSURE ASSEMBLY

FIELD OF INVENTION

The invention relates to a drive unit enclosure assembly and, more particularly, to an agricultural applicator with a drive unit and an associated enclosure assembly having a first hinged panel and a second hinged panel configured to enhance access to the drive unit.

BACKGROUND OF INVENTION

Numerous types of agricultural applicators are available today. These can include a pull type unit or a self-propelled unit. A certain known agricultural applicator is also referred to a "floater." The floater is a large vehicle that uses large, oversized floatation tires to carry the vehicle across firm to muddy agricultural environments. The chassis assembly of the floater generally includes three or more floatation tires. One particular chassis assembly includes a pair of rear floatation tires and a pair of front floatation tires. The chassis assembly is configured to support one or more bulk storage tanks or bins of product for application in an agricultural environment, usually before planting in the spring or after harvest in the fall. The types of agricultural products e.g., fertilizer, herbicide, pesticide, nutrients, etc. can vary. The floater can also be utilized to tow various agricultural implements. The oversized-tired agricultural applicators are generally desired for their ability to maneuver heavy loads over extremely rough and difficult agricultural terrain with minimal soil compaction.

However, these floater-type of agricultural applicators have drawbacks. For example, certain known floater-type agricultural applicators include an enclosure for a drive unit mounted toward a rearward end of the chassis assembly and behind a cab relative to a forward direction of travel of the agricultural applicator. A raised platform or walkway is provided from the cab to the drive unit enclosure. The drive unit enclosure typically includes a single-piece hood operable to open and provide access to the drive unit. The single piece hood generally does not provide adequate access to routine service points (e.g., air filter, oil level dipstick, engine valve backlash, etc.) of the drive unit. In addition, the single-piece hood generally extends the length of the drive unit and therefore is too heavy and cumbersome for a single person to move between a closed position and an open position.

U.S. Publication No. US 2003/0051931 to Johansson et al. discloses an engine housing for a motor mounted on a forward vehicle section. The engine housing includes a vertically aligned door and grille extending the height of the forward vehicle section. The door is pivotally attached about a lower horizontal end by a hinge arrangement disposed adjacent to the lower end of the motor. The inside of the door includes a pair of girders and steps mounted thereon operable in an open position to provide a ladder for accessing the motor. The door further includes a pair of locking devices mounted on each side of the hood and a structure of steps mounted on the hood. As with other known enclosures, the Johansson et al. vertical door and the structure of steps mounted thereon is heavy and cumbersome for a single person to move when accessing or servicing the motor.

U.S. Pat. No. 6,508,323 to Burgo discloses a hood for an earthmoving machine. The hood includes a front panel and a pair of side panels that extend the longitudinal length of the drive unit relative to a forward direction of travel of the machine. Again, the Burgo hood does not provide ready access to routine service points (e.g., air filter, oil level dipstick, engine valve backlash, etc.) of the drive unit, and the hood is of a length that is heavy and cumbersome to move between an open and closed positions.

Thus, there is a need for an enclosure for a drive unit configured to enhance ease of access to routine service points of the drive unit, and that is operable for a single person to readily move between an open and closed positions.

SUMMARY OF THE INVENTION

The present invention provides an enclosure assembly for a drive unit of an agricultural applicator. The agricultural applicator includes a frame assembly to support the drive unit on a plurality of wheel assemblies. The drive unit includes a housing to receive the drive unit. The drive unit includes an exhaust outlet extending upward from the drive unit. The enclosure assembly generally includes a first panel and a second panel. The first and second panels are pivotally connected to the housing and moveable between a closed position and an open position. The first and second panels each include a forward end and a rearward end relative to a forward direction of travel. In the closed position, the first panel adjoins, and is positioned in general alignment with, the second panel. The enclosure assembly also accommodates the exhaust outlet extending upward from the drive unit. The forward end of the first panel includes a first cutout portion configured in the closed position to receive a first portion of the exhaust outlet. The rearward end of the second panel includes a second cutout portion configured in the closed position to receive a second portion of exhaust outlet. From the closed position, the first panel pivots to the open position in a rearward direction relative to the forward direction of travel. From the closed position, the second panel pivots to the open position in a forward direction relative to the forward direction of travel. The pivoting first and second panels enhance the ease and readiness in accessing and servicing the drive unit.

In a preferred embodiment of the enclosure assembly, the enclosure assembly further comprises a first latch mechanism having a first latch portion releaseably connected to a second latch portion. The first latch portion is centrally mounted at the top surface of, and at the forward end of, the first panel. The second latch portion of the first latch mechanism is mounted at the top surface of, and at the rearward end of, the second panel. The first latch mechanism releaseably secures the first panel in the closed position with the second panel in the closed position.

The preferred enclosure assembly further includes a support structure positioned in the interior of the housing and coupled to the frame assembly of the agricultural applicator. The support structure includes a first lateral extending arm and a second lateral extending arm. The first lateral extending arm is positioned to support the forward end of the first panel in the closed position. The second lateral extending arm is positioned to support the rearward end of the second panel in the closed position.

The preferred enclosure assembly further includes a second latch mechanism having a first latch portion releaseably secured to a second latch portion. The first latch portion of the second latch mechanism is attached at the bottom surface of the second panel. The second latch portion of the second latch mechanism is mounted at the second lateral extending arm. The second latch mechanism releaseably secures the second panel in the closed position to the support structure of the enclosure assembly and the frame assembly of the agricultural applicator.

In another embodiment, the present invention provides an agricultural applicator that includes a frame assembly mounted on a plurality of wheel assemblies, and a drive unit mounted on the frame assembly. The drive unit is configured to drive the agricultural applicator in at least a forward direction of travel. The agricultural applicator further includes an enclosure assembly for the drive unit in accordance with the present invention. The enclosure assembly includes a first panel in combination with a first pivotal hinge assembly. The first panel generally has a forward end and a rearward end relative to the forward direction of travel. The first pivotal hinge is coupled to the rearward end of the first panel. The enclosure assembly further includes a second panel in combination with a second pivotal hinge. The second panel is generally aligned with the first panel above the drive unit. The second panel also generally includes a forward end and a rearward end relative to the forward direction of travel. The second pivotal hinge is coupled to the forward end of the second panel, and is disposed opposite and forward relative to the first pivotal hinge. The first and second panels in a closed position are in general alignment and positioned such that the forward end of the first panel adjoins the rearward end of the second panel. From the closed position, the first and second panels each swing toward an open position in opposite directions relative to the other.

The present invention also provides a method of accessing a drive unit of an agricultural applicator, the agricultural applicator including a frame assembly with housing configured to receive the drive unit. The method includes providing a first panel and a second panel, the first and second panels pivotally connected to the housing and being movable between an open position and a closed position, and a support structure located in the housing having at least one lateral arm in support of the first and second panels; providing a first latch mechanism releaseably coupling the first panel to the second panel, and a second latch mechanism releaseably coupling the second latch mechanism to the internal support structure; releasing the first latch mechanism; and swinging the first panel in a rearward direction relative to the forward direction of travel so as provide access to a first portion of the drive unit without releasing the second panel from second latch mechanism. The method can further include releasing the second latch mechanism, and swinging the second panel in a forward direction relative to the forward direction of travel so as to provide access to a second portion of the drive unit.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

A wide variety of vehicles could be constructed in accordance with the invention defined by the claims. Hence, while preferred embodiments of an enclosure in accordance with the invention will now be generally described with reference to a drive unit for a four-wheeled agricultural applicator, it should be understood that the invention is in no way so limited. The enclosure can be configured for any type of drive unit (e.g., hydraulic, pneumatic, mechanical, electrical, etc.) or combinations thereof of any type of mobile vehicle.

Figure 1:
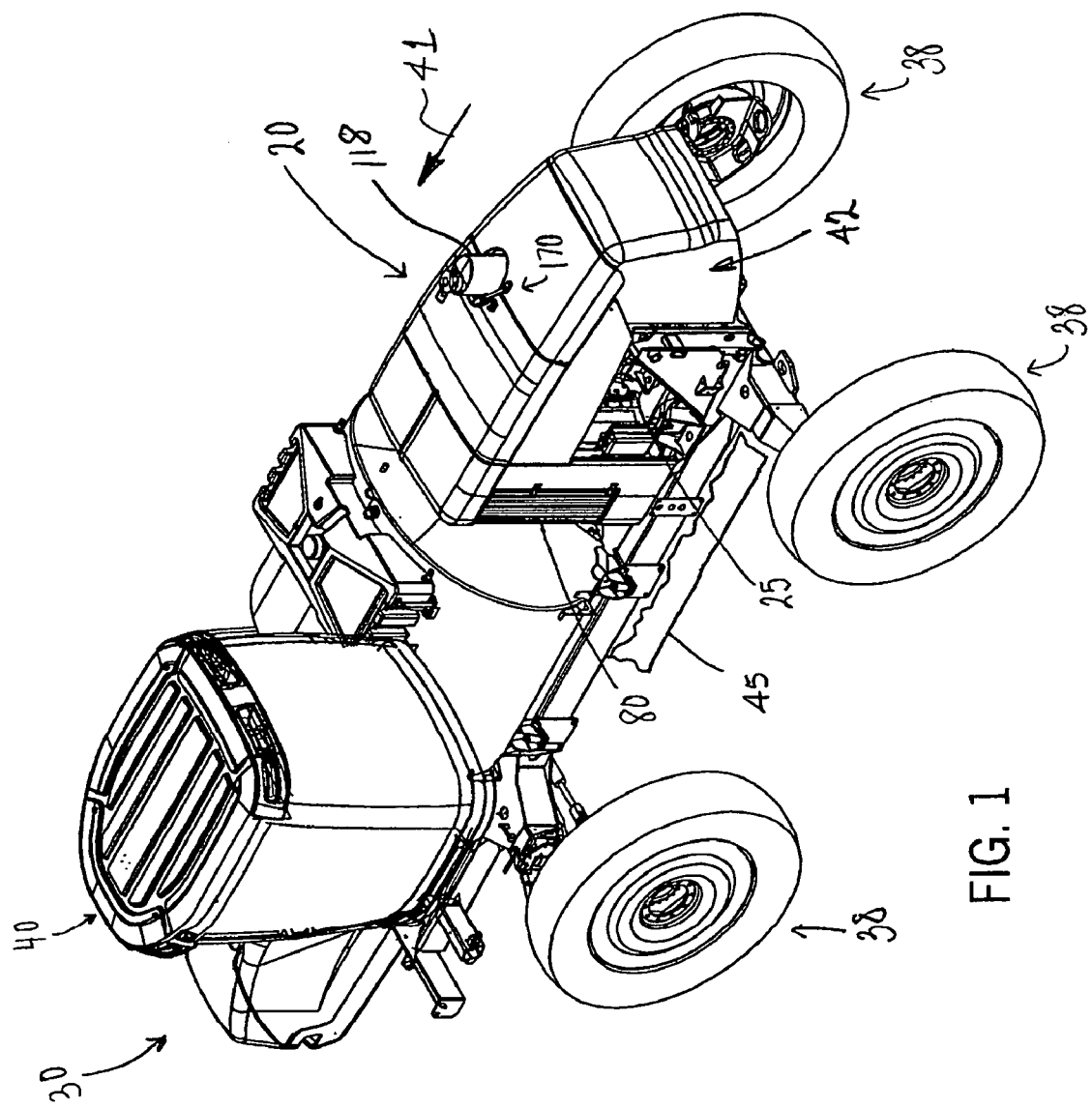
FIG. 1 illustrates a perspective view of a four-wheeled agricultural applicator having a drive unit enclosure in accordance with the present invention in a closed position.

FIG. 1 illustrates an enclosure assembly 20 in accordance with the present invention enclosing a drive unit 25 of an agricultural applicator 30. The preferred agricultural applicator 30 includes a frame assembly 35 configured to support the drive unit 25 on a series of wheel assemblies 38. Although a four-wheeled agricultural applicator 30 is shown, it is understood that the number of wheel assemblies 38 can vary. The agricultural applicator 30 further includes a cab 40 positioned on the frame assembly 35. The drive unit 25 is positioned rearward from the cab 40 relative to a forward direction of travel (illustrated by arrow 41) of the agricultural applicator 30. The frame assembly 35 further includes a housing 42 configured to at least partially encloses the drive unit 25.

Still referring to FIG. 1, as is commonly known in the art, the preferred drive unit 25 includes a radiator (not shown) disposed at a forward end of the drive unit 25, a hydraulic reservoir (not shown) disposed at a rearward end of the drive unit 25, and an engine drive (not shown) disposed therebetween. The radiator cools the engine drive in a known manner. The hydraulic reservoir provides hydraulic flow and pressure to various hydraulically-driven systems of the agricultural applicator 30. The engine drive is interconnected to drive at least one of the wheel assemblies 38 of the agricultural applicator 30 in the forward direction of travel 41. Although a preferred drive unit 25 is described and shown, the type (e.g., diesel, etc.) and components (e.g., hydraulic system, pneumatic system, etc.) and combinations thereof comprising the drive unit 25 can vary and is not limiting on the invention. A raised walkway or platform 45 (partially illustrated) extends from the cab 40 toward the enclosure assembly 20. The raised walkway 45 allows an operator ready access to the enclosure assembly 20 and the respective drive unit 25 enclosed therein.

Referring to FIGS. 3–6, a preferred housing 42 includes a forward fixed portion 50, a rearward fixed portion 55, and a top portion 60 relative to the forward direction of travel 41 of the agricultural applicator 30. A first side support 65 and a second side support 70 are attached and extend between the forward fixed portion 50 and the rearward fixed portion 55 of the enclosure assembly 20. The forward fixed portion 50 of the housing 42 includes a radiator grille 80 located adjacent to the radiator of the drive unit 25 enclosed by the enclosure assembly 20.

The enclosure assembly 20 in accordance with present invention is mounted on the housing 42. The preferred enclosure assembly 20 includes a first hinged panel 90 positioned adjacent a second hinged panel 95. The first hinged panel 90 includes a forward end 96 and a rearward end 98. The preferred first hinged panel 90 further includes a first sidewall 100 and a second sidewall 102 positioned on opposite sides of the first hinged panel 90. The second hinged panel 95 includes a forward end 104 and a rearward end 106, and a first sidewall 108 and a second sidewall 110 in a generally similar construction relative to the first hinged panel 90.

The first hinged panel 90 is located rearward from the second hinged panel 95. In a closed position as shown by FIG. 1, the first and second hinged panels 90 and 95 are generally aligned with one another and with the remaining top portion 60 of the enclosure assembly 20. The first and second hinged panels 90 and 95 are generally the same length and width, but their relative dimensions can vary. Moreover, the first and second hinged panels 90 and 95 can occupy all or a portion of the top portion 60 of the housing 42.

The forward end 96 of the first hinged panel 90 includes a first cutout portion 115 configured to receive at least a first portion of an exhaust outlet 118 (e.g., muffler) extending vertically upward from the enclosed drive unit 25. The rearward end 106 of the second hinged panel 95 includes a second cutout portion 120 configured to receive a remaining portion of the exhaust outlet. The first and second cutout portions 115 and 120 are preferably curvilinear-shaped to receive the cylindrical-shaped exhaust outlet 118 shown in FIG. 1. However, the shape (e.g., polygonal, cylindrical, etc.) of the cutout portions 115 and 120 can vary.

Figure 2:
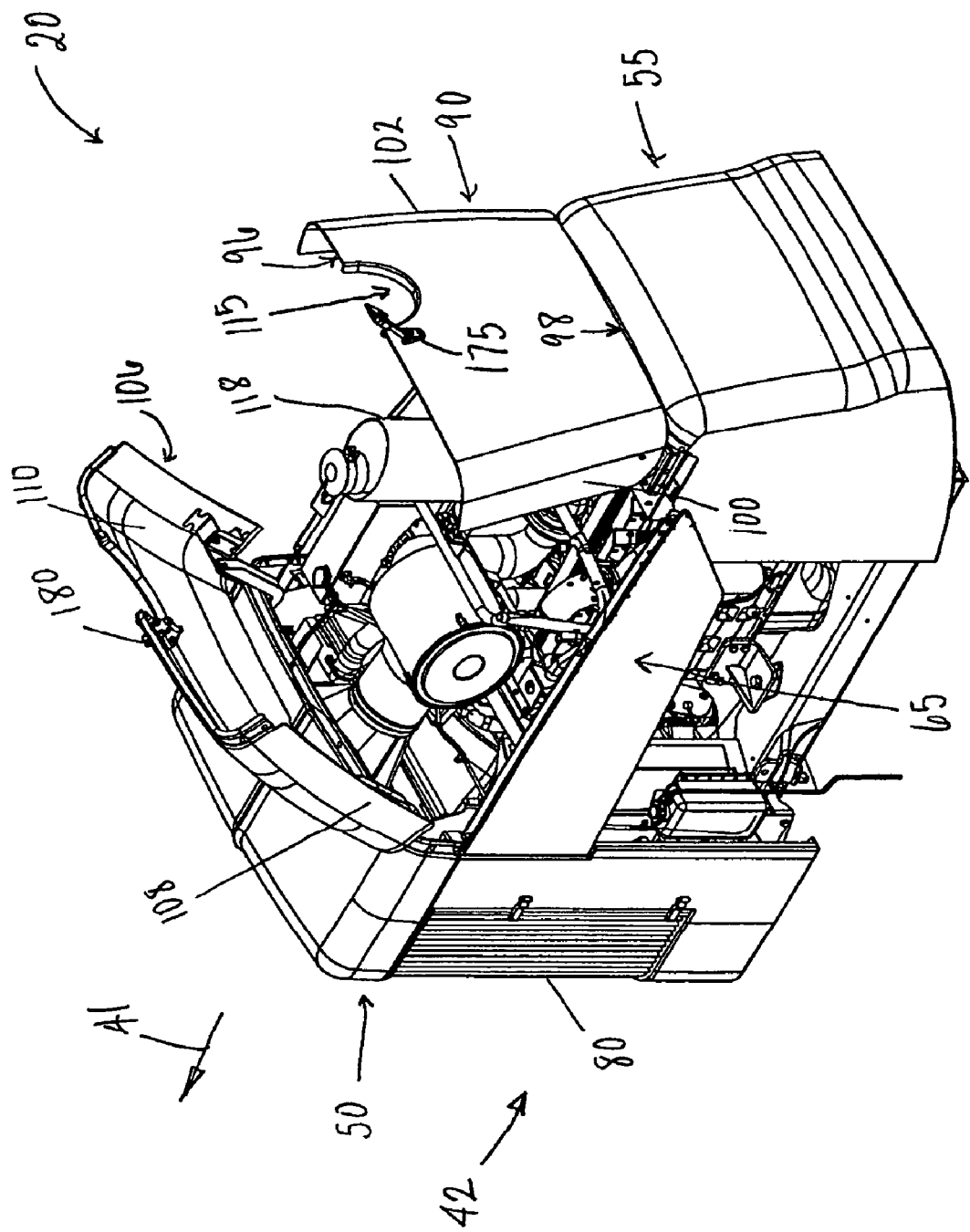
FIG. 2 illustrates a detailed perspective view of the engine enclosure of the four-wheeled agricultural applicator in FIG. 1, the engine enclosure in a fully-open position.
Figure 3:
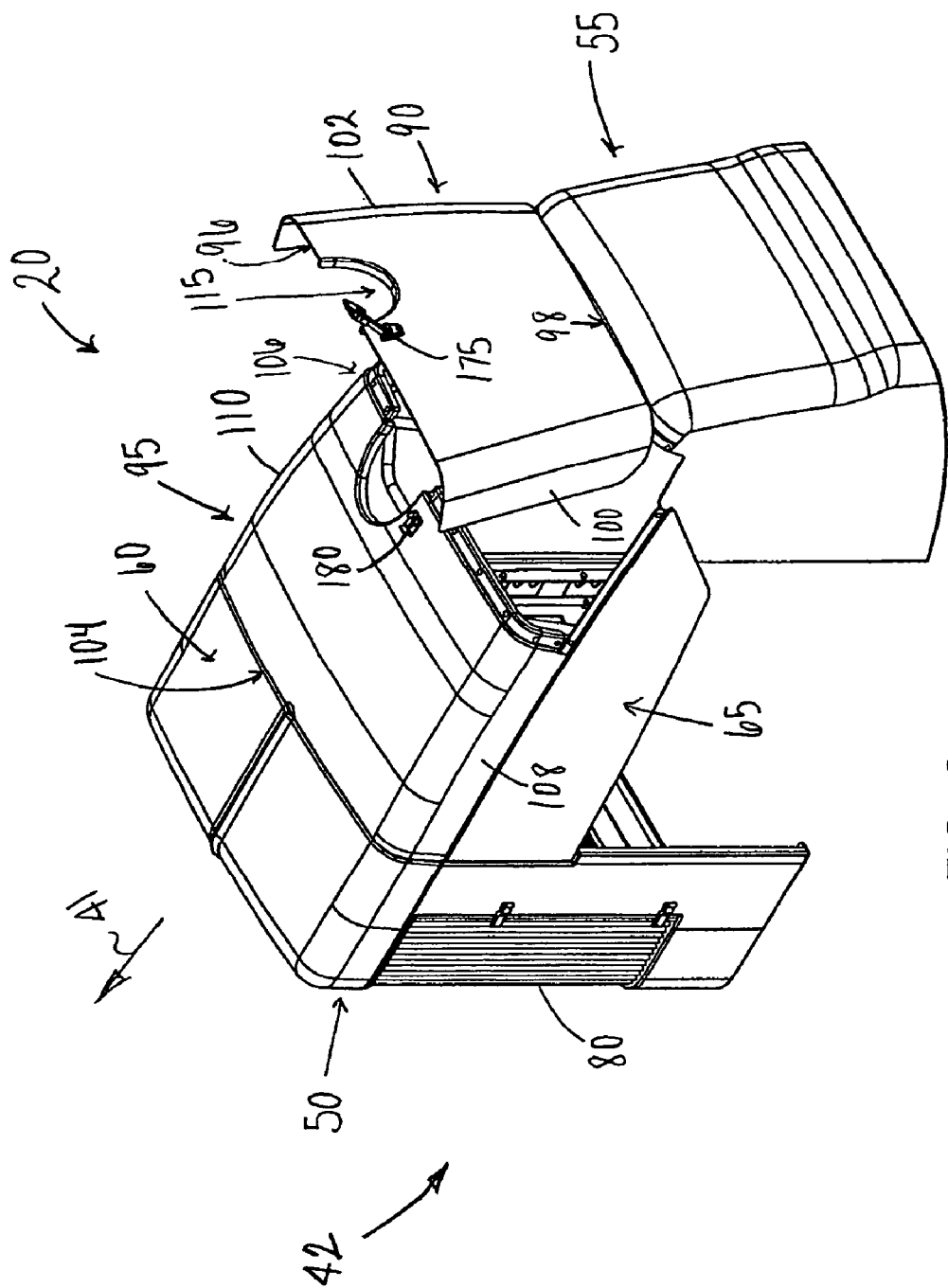
FIG. 3 illustrates a detailed perspective view of the engine enclosure in FIG. 1 in a partially-open position.
Figure 4:
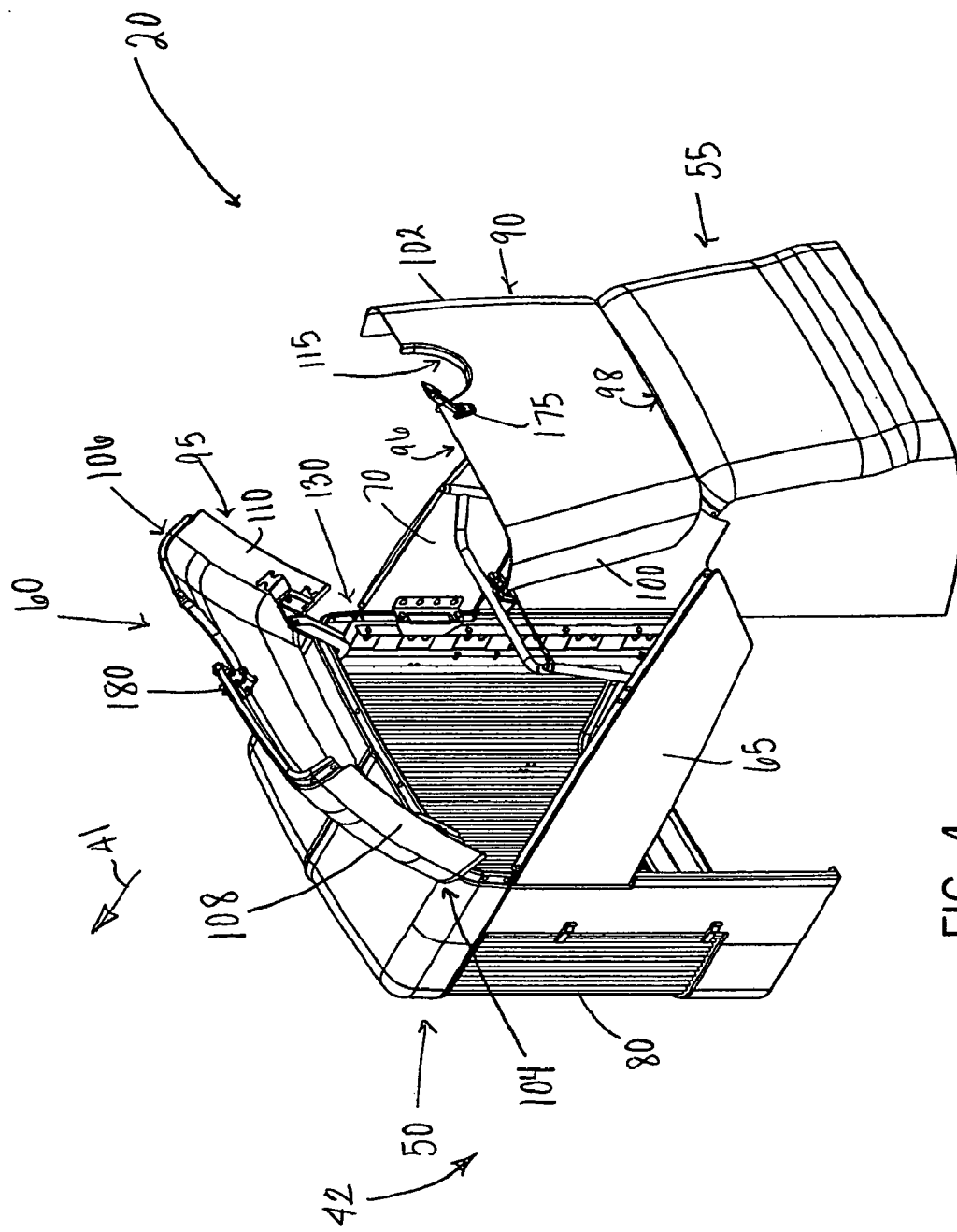
FIG. 4 illustrates a detailed perspective view of the engine enclosure in FIG. 3 in a fully-open position.
Figure 5:
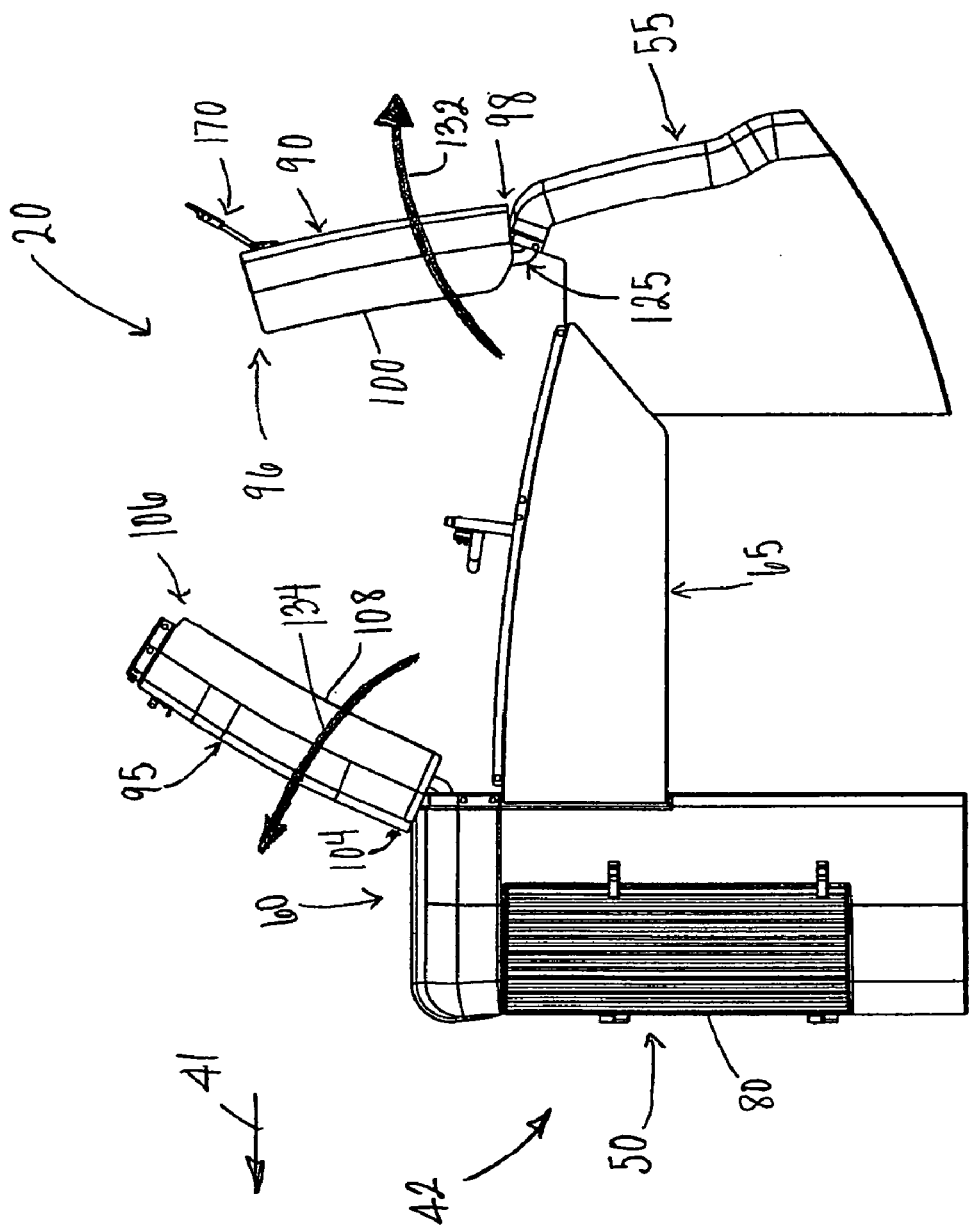
FIG. 5 illustrates a side view of the engine enclosure in FIG. 4.
Figure 6:
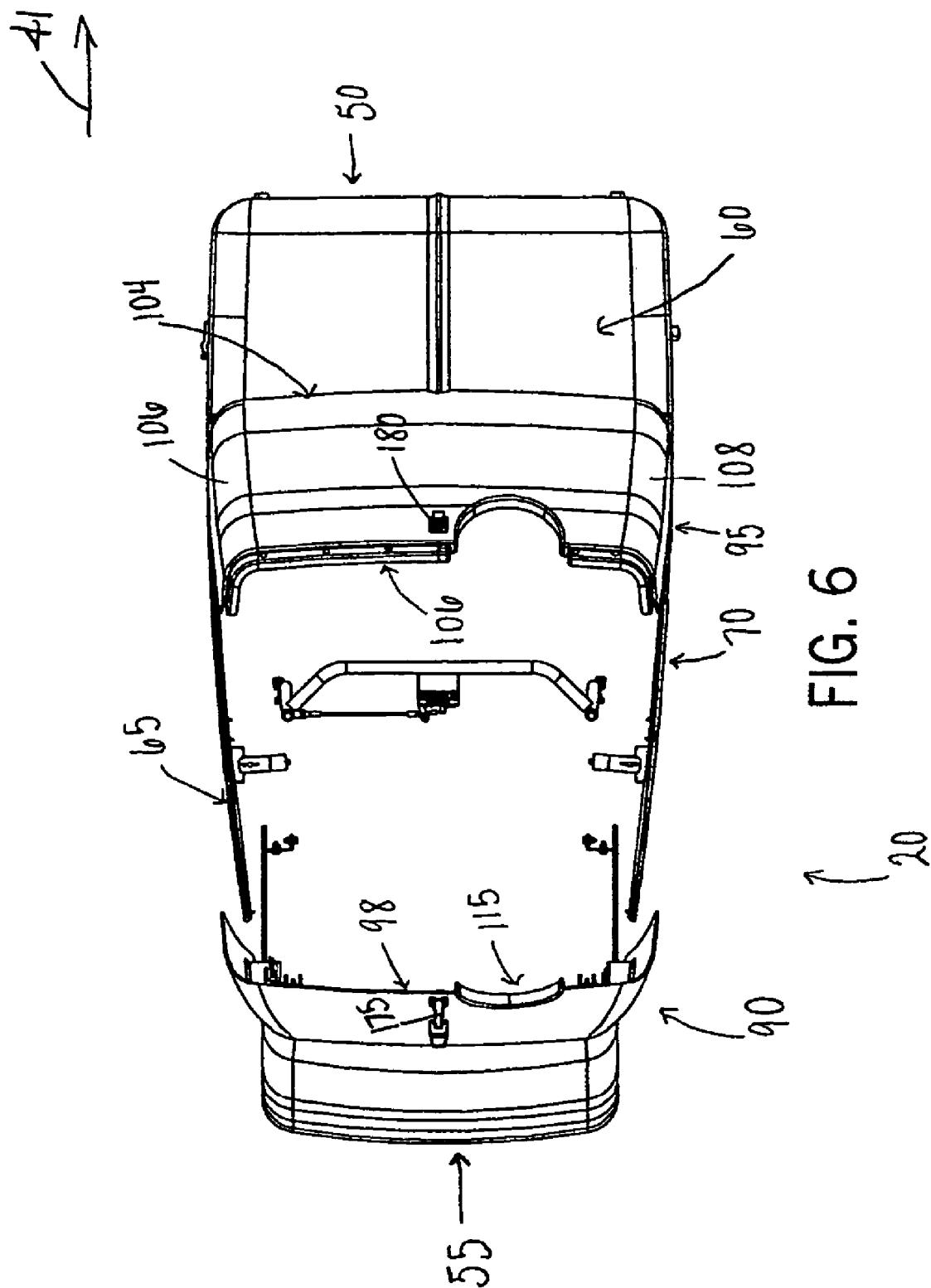
FIG. 6 illustrates a plan view of the engine enclosure in FIG. 4.

The enclosure assembly 20 further includes a first hinge assembly 125 and a second hinge assembly 130. The first hinged panel 90 is coupled by the first hinge assembly 125 to the rearward fixed portion 55 of the housing 42. The first hinge assembly 125 is attached at the rearward end 98 of the first hinged panel 90 such that the first hinged panel 90 swings or pivots open in a rearward direction (shown as direction arrow 132) relative to the forward direction of travel 41. The second hinged panel 95 is coupled by the second hinge assembly 130 to the top portion 60 of the housing 42. The second hinged panel 95 is attached at the forward end 106 of the second hinged panel 95 such that the second hinged panel 95 swings or pivots open in forward direction (shown as direction arrow 134) relative to the forward direction of travel 41 and opposite the rearward swing direction 132 of the first hinged panel 90. The first and second hinged panels 90 and 95 thus swing open in opposite directions 132 and 134 to provide ready access to the enclosed drive unit 25 (See FIGS. 1 and 2).

The enclosure assembly 20 further includes a support structure 150 positioned or located inside the housing 42. The support structure 150 is preferably coupled to the frame assembly 35. The preferred support structure 150 includes a first extending lateral arm 155 and a second lateral extending arm 160. The first lateral arm 155 extends in a generally lateral direction in support of the forward end 96 of the first hinged panel 90 in the closed position shown in FIG. 1. The second lateral arm 155 extends in a generally lateral direction in support of the rearward end 106 of the second hinged panel 95 in the closed position. The first and second lateral arms 155 and 160 have a generally flat configuration to engage the bottom surfaces 162 and 164 of the first and second hinged panels 90 and 95, respectively. The composition (e.g., plastic, metallic, etc.) and type (e.g., bar, rod, tube, etc.) of support structure 150 can vary.

A first latch mechanism 170 secures the first hinged panel 90 in the closed position as shown in FIG. 1. The preferred first latch mechanism 170 is configured to releaseably couple the first hinged panel 90 in the closed position to the second hinged panel 95 in the closed position. The first latch mechanism 170 includes a first latch portion 175 releaseably connected to a second latch portion 180. The first latch portion 175 is centrally mounted at the forward end 96 of the top surface of the first hinged panel 90. The second latch portion 180 is centrally mounted at the rearward end 106 of the top surface of the second hinged panel 95. The number, location, and type (e.g., hook assembly, sliding bolt assembly, etc.) of first latch mechanism 170 can vary.

The second hinged panel 95 is secured in a closed position by a second latch mechanism 190. The preferred second latch mechanism 190 is configured to releaseably couple the second hinged panel 95 in the closed position to the frame assembly 35. The second latch mechanism 190 includes a first latch portion 195 releaseably connected to a second latch portion 198, similar to the first latch mechanism 170 described above. The first latch portion 195 of the second latch mechanism 190 is mounted or attached at the rearward end 106 of the bottom surface of the second hinged panel 95. The second latch portion 198 of the second latch mechanism 190 is mounted on the second lateral arm 160 of the support structure 150. The number, location, and type (e.g., hook assembly, sliding bolt assembly, etc.) of second latch mechanism 190 can vary.

In operation, an operator releases the first latch mechanism 170 and swings the first hinged panel 90 of the enclosure assembly 20 in a rearward direction (i.e., a clockwise direction), relative to the forward direction of travel 41, from the closed position (See FIG. 1) to an open position (See FIGS. 2–6) to gain access to routine service points of the drive unit 25. The routine service points of the drive unit 25 can include the engine oil dipstick, the hydraulic reservoir dipstick, and the air filter. To gain access to a remainder of the drive unit 25, the operator releases second latch mechanism 190 and swings the second hinged panel 95 in a forward direction (i.e., counterclockwise direction), relative to the forward direction of travel 41, from the closed position (See FIG. 1) to an open position (See FIGS. 2 and 4–5). The first hinged panel 90 and the second hinged panel 95 are hinged at opposite ends such that the first and second hinged panels 90 and 95 swing open in opposite directions to provide full access to service the enclosed drive unit. In contrast, certain known engine enclosure assemblies include a single-piece hood assembly that is typically too high as well as too heavy for an operator to readily open. Moreover, these certain known engine enclosure assemblies do not provide adequate access to routine service points of the enclosed engine and hydraulic drive unit.

In addition, the first and second hinged panels 90 and 95 of the enclosure assembly 20 of the preferred embodiment do not extend as high as these certain known one-piece hood assemblies. In further addition, the enclosure assembly 20 of the preferred embodiment does not require lift assistance components because the individual weight of the first and second hinged panels 90 and 95 is less than the certain known single-piece hood assemblies.

Many changes and modifications could be made to the invention without departing from the spirit thereof. The scope of these changes will become apparent from the appended claims.

We claim:

1. An enclosure assembly for a drive unit of an agricultural applicator, the agricultural applicator having a frame assembly supporting the drive unit on a plurality of wheel assemblies in a forward direction of travel, the frame assembly including a housing to receive the drive unit, the drive unit including an exhaust outlet extending upward from the drive unit, the enclosure assembly comprising:

a first panel having a forward end and a rearward end relative to the forward direction of travel, the first panel pivotally connected to the housing and being movable between an open position and a closed position; and a second panel having a forward end and a rearward end relative to the forward direction of travel, the second panel pivotally connected to the housing and being movable between an open position and a closed position, and wherein the first panel in the closed position is positioned in general alignment with the second panel in the closed position, wherein the first panel pivots from the closed position to the open position in a rearward relative to the forward direction of travel, and wherein the second panel pivots from the closed position to the open position in a forward direction relative to the forward direction of travel, and wherein the forward end of the first panel includes a first cutout portion configured in the closed position to receive a first portion of the exhaust outlet, and wherein the rearward end of the second panel includes a second cutout portion configured in the closed position to receive a second portion of exhaust outlet.

2. The enclosure assembly as recited in claim 1, wherein the first panel and the second panel each include a top surface, and the enclosure further comprises:

a first latch mechanism, the first latch mechanism including a first latch portion releaseably connected to a second latch portion, wherein the first latch portion of the first latch mechanism is centrally mounted to the top surface of, and at the forward end of, the first panel relative to the forward direction of travel, wherein the second portion of the first latch mechanism is mounted to the top surface of, and at the rearward end of, the second panel, relative to the forward direction of travel, and wherein the first latch mechanism releaseably secures the first panel with the second panel in the closed position.

3. The enclosure assembly as recited in claim 2, further comprising:

a first hinge assembly coupling the rearward end of the first panel to the housing relative to the forward direction of travel; and a second hinge assembly coupling the forward end of the second panel to the housing relative to the forward direction of travel.

4. The enclosure assembly as recited in claim 2, further including:

a support structure positioned in an interior of the housing and coupled to the frame assembly of the agricultural applicator, the support structure including a first lateral extending arm and a second lateral extending arm, the first lateral extending arm positioned to support the forward end, relative to the forward direction of travel, of the first panel in the closed position, the second lateral extending arm positioned to support the rearward end, relative to the forward direction of travel, of the second panel in the closed position.

5. The enclosure assembly as recited claim 2, wherein the second panel includes a bottom surface opposite the top surface of the second panel, and further comprising a second latch mechanism, the second latch mechanism having a first portion releaseably secured to a second portion, the first portion of the second latch mechanism coupled to the bottom surface of the second panel, the second portion of the second latch mechanism mounted to the second lateral extending arm, wherein the second latch mechanism releaseably secures the second panel in the closed position to the frame assembly of the agricultural applicator.

6. The enclosure assembly as recited in claim 5, wherein first lateral arm engages the forward end of the first panel in the closed position.

7. The enclosure assembly as recited in claim 5, further comprising an opening that extends between the top and bottom surfaces of the second panel, wherein the first panel further includes a lever that extends through the opening in the second panel, and wherein a movement of the lever is operable to release the first panel from the first latch mechanism without releasing the second panel from the second latch mechanism.

8. The enclosure assembly as recited in claim 2, wherein the first panel in the open position provides access to a first portion of the drive unit.

9. The enclosure assembly as recited in claim 2, wherein the second panel in the open position provides access to a second portion of the drive unit opposite the first portion of the drive unit.

10. An agricultural applicator comprising:

a frame assembly mounted on a plurality of wheel assemblies, the frame assembly including a housing;

a drive unit positioned in the housing and mounted on the frame assembly, the drive unit configured to drive the agricultural applicator on the plurality of wheel assemblies in a forward direction of travel, the drive unit including an exhaust outlet extending upward from the drive unit; and an enclosure assembly for the drive unit, the enclosure assembly comprising:

a first panel having a forward end and a rearward end relative to the forward direction of travel, the first panel pivotally connected to the housing and being movable between an open position and a closed position;

a second panel having a forward end and a rearward end relative to the forward direction of travel, the first panel pivotally connected to the housing and being movable between an open position and a closed position; and a support structure located inside the housing and coupled to the frame assembly of the agricultural applicator, the support structure including a first lateral extending arm and a second lateral extending arm, the first lateral extending arm positioned to support the forward end of the first panel in the closed position, the second lateral extending arm positioned to support the rearward end of the second panel in the closed position, wherein the first and second panels in the closed position are positioned such that the forward end of the first panel is located substantially juxtaposed relative to the rearward end of the second panel, and wherein the first and second panels each swing from the closed position to an open position in opposite directions relative to the other.

11. The agricultural applicator as recited in claim 10, wherein the enclosure assembly further includes:
   a first pivotal hinge assembly coupling the forward end of the first panel to the housing relative to the forward direction of travel; and
   a second pivotal hinge assembly coupling the rearward end of the second panel to the housing, the second pivotal hinge assembly disposed opposite and rearward along the frame assembly relative to the first pivotal hinge assembly relative to the forward direction of travel.

12. The agricultural applicator as recited in claim 10, wherein the forward end of the first panel, relative to the forward direction of travel, includes a first cutout portion configured in the closed position to receive a first portion of the exhaust outlet, and
wherein the rearward end of the second panel, relative to the forward direction of travel, includes a second cutout portion configured in the closed position to receive a second portion of the exhaust outlet.

13. The agricultural applicator as recited in claim 10, wherein the first and second panels each include a top surface and a bottom surface, and the enclosure assembly further comprising:
   a first latch mechanism, the first latch mechanism including a first latch portion releaseably connected to a second latch portion,
wherein the first latch portion of the first latch mechanism is centrally mounted to the top surface of, and at the forward end of, the first panel,
wherein the second portion of the first latch mechanism is mounted to the top surface of, and at the rearward end of, the second panel, and
wherein the first latch mechanism releaseably secures the first panel with the second panel in the closed position.

14. The agricultural applicator as recited in claim 13, further comprising:
   a second latch mechanism, the second latch mechanism having a first portion releaseably secured to a second portion, the first portion of the second latch mechanism coupled to the bottom surface of the second panel, the second portion of the second latch mechanism mounted to the second lateral extending arm, wherein the second latch mechanism releaseably secures the second panel in the closed position to the frame assembly.

15. The agricultural applicator as recited in claim 14, further comprising:

an opening that extends between the top and bottom surfaces of the second panel, wherein the first panel further includes a lever that extends through the opening in the second panel, and wherein a movement of the lever is operable to release the first panel from the first latch mechanism without releasing the second panel from the second latch mechanism.

16. The agricultural applicator as recited in claim 10, wherein the first panel in the open position provides access to a first portion of the drive unit.

17. The agricultural applicator as recited in claim 10, wherein the second panel in the open position provides access to a second portion of the drive unit opposite the first portion of the drive unit.

18. The agricultural applicator as recited in claim 10, wherein the enclosure assembly and drive unit are located rearward from the cab relative to the forward direction of travel of the agricultural applicator, and the agricultural applicator further comprising:
   a walkway extending from the cab to the enclosure assembly and the drive unit in such a manner so to allow an operator on the walkway to access the enclosure assembly and drive unit located therein.

19. A method of accessing a drive unit of an agricultural applicator, the agricultural applicator including a frame assembly with a housing configured to receive the drive unit, the method comprising:
   providing a first panel and a second panel, the first and second panels pivotally connected to the housing and being movable between an open position and a closed position, and a support structure located in the housing having at least one lateral arm in support of the first and second panels;
   providing a first latch mechanism releaseably coupling the first panel to the second panel, and a second latch mechanism releaseably coupling the second latch mechanism to the internal support structure;
   releasing the first latch mechanism; and
   swinging the first panel in a rearward direction relative to the forward direction of travel so as provide access to a first portion of the drive unit without releasing the second panel from second latch mechanism.

20. The method as recited in claim 19, the method further comprising:
   releasing the second latch mechanism; and
   swinging the second panel in a forward direction relative to the forward direction of travel so as to provide access to a second portion of the drive unit.

* * * * *